United States Patent
Sheikh et al.

(10) Patent No.: US 12,218,502 B2
(45) Date of Patent: Feb. 4, 2025

(54) METHOD AND SYSTEM USING VIRTUAL NETWORKS WITH POWER SUBSTATION NETWORKS AND CONTROL SERVERS

(71) Applicant: SAUDI ARABIAN OIL COMPANY, Dhahran (SA)

(72) Inventors: Abdullah U. Sheikh, Rawabi (SA); Ammar F. Eithan, Dhahran (SA); Mohammad Zarar Mir, Dammam (SA); Noorul Ameen, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 360 days.

(21) Appl. No.: 17/818,900

(22) Filed: Aug. 10, 2022

(65) Prior Publication Data
US 2024/0055857 A1     Feb. 15, 2024

(51) Int. Cl.
H02J 3/00     (2006.01)
(52) U.S. Cl.
CPC ............ *H02J 3/0075* (2020.01); *H02J 3/003* (2020.01)
(58) Field of Classification Search
None
See application file for complete search history.

(56) References Cited

U.S. PATENT DOCUMENTS

| | | |
|---|---|---|
| 8,005,013 B2 | 8/2011 | Teisberg et al. |
| 9,515,845 B2 | 12/2016 | Cachin et al. |
| 11,025,492 B2 | 6/2021 | Saltsidis |
| 2018/0219798 A1 | 8/2018 | Dutil et al. |
| 2018/0287422 A1* | 10/2018 | Seewald .............. H04L 41/12 |
| 2020/0267094 A1 | 8/2020 | Maruyama et al. |
| 2021/0175722 A1* | 6/2021 | Zafirovic-Vukotic ...... H04L 43/0852 |

* cited by examiner

*Primary Examiner* — Paul B Yanchus, III
(74) *Attorney, Agent, or Firm* — Osha Bergman Watanabe & Burton LLP

(57) ABSTRACT

A method may include establishing, over a first virtual network in a first power substation network, a first communication path between a control server and a first intelligent electronic device (IED). The method may further include generating a Parallel Redundancy Protocol (PRP) virtual network in the first power substation network in response to determining that a PRP-based IED is being added to the first power substation network. The method may further include establishing, over the PRP virtual network, a second communication path and a third communication path between the control server and the PRP-based IED. The method may further include transmitting first control data to the first IED over the first communication path and second control data to the PRP-based IED over the second communication path.

20 Claims, 6 Drawing Sheets

METHOD AND SYSTEM USING VIRTUAL NETWORKS WITH POWER SUBSTATION NETWORKS AND CONTROL SERVERS

BACKGROUND

Electrical power grids may be monitored and controlled by various electrical devices and control systems implemented over different power substations. In order to maintain reliability in an electric power grid, power substation infrastructure may rarely change. For example, adding or removing network devices could result in significant downtime for the electric power grid. As such, there are difficulties with adding new devices to an existing power substation network without interfering with ongoing network operations with current control systems.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes establishing, by a network controller and over a first virtual network in a first power substation network, a first communication path between a control server and a first intelligent electronic device (IED). The first virtual network uses a first network protocol that prevents redundant paths within the first virtual network. The first IED is coupled to a sensor that is coupled to a first electric power hardware device. The method further includes generating, by the network controller, a Parallel Redundancy Protocol (PRP) virtual network in the first power substation network in response to determining that a PRP-based IED is being added to the first power substation network. The method further includes establishing, by the network controller and over the PRP virtual network, a second communication path and a third communication path between the control server and the PRP-based IED. The second communication path corresponds to a first plurality of network elements in the first power substation network and the third communication path corresponds to a second plurality of network elements in the first power substation network that are different than the first plurality of network elements. The PRP virtual network uses a second network protocol that is different from the first network protocol that is used by the first virtual network. The method further includes transmitting first control data to the first IED over the first communication path and second control data to the PRP-based IED over the second communication path.

In general, in one aspect, embodiments relate to a computer system that includes a computer processor and a memory coupled to the computer processor, wherein the memory includes instructions executable by the computer processor that establish, over a first virtual network in a first power substation network, a first communication path between a control server and a first intelligent electronic device (IED). The first virtual network uses a first network protocol that prevents redundant paths within the first virtual network. The first IED is coupled to a sensor that is coupled to a first electric power hardware device. The instructions further generate a Parallel Redundancy Protocol (PRP) virtual network in the first power substation network in response to determining that a PRP-based IED is being added to the first power substation network. The instructions further establish, over the PRP virtual network, a second communication path and a third communication path between the control server and the PRP-based IED. The second communication path corresponds to a first plurality of network elements in the first power substation network and the third communication path corresponds to a second plurality of network elements in the first power substation network that are different than the first plurality of network elements. The PRP virtual network uses a second network protocol that is different from the first network protocol that is used by the first virtual network.

In general, in one aspect, embodiments relate to a system that includes a control server, a network controller includes a computer processor, and a power substation network coupled to the control server and the network controller. The power substation network includes a first set of network elements and a second set of network elements that are different from the first plurality of network elements. The power substation network further includes a first intelligent electronic device (IED) coupled to the first set of network elements, and the second set plurality of network elements. The first IED transmits power substation data over a first virtual network to the control server using a first communication path using a first network protocol. The system further includes a second IED coupled to the control server and the power substation network. The network controller establishes, over a Parallel Redundancy Protocol (PRP) virtual network, a second communication path and a third communication path between the control server and the second IED. The second communication path corresponds to the first set of network elements and the third communication path corresponds to the second set of network elements. The PRP virtual network uses a second network protocol that is different from the first network protocol.

In some embodiments, a determination is made that a third IED is being added to a second power substation network coupled to the control server. A third virtual network may be generated in the second power substation network in response to determining that the third IED is being added to the second power substation network, where the third IED is added to the third virtual network. In some embodiments, a PRP virtual network is generated after the first IED is connected to the first power substation network. In some embodiments, the first IED transmits first IED data to the control server over the first communication path. A PRP-based IED may transmit second IED data to the control server over at least one of the second communication path and the third communication path. In some embodiments, the first IED data corresponds to sensor data regarding a first electric power hardware device coupled to the first IED and the second IED data corresponds to sensor data for a second electric power hardware device coupled to the PRP-based IED. In some embodiments, a determination is made that a third IED is being added to a second power substation network. A third virtual network may be generated in the second power substation network in response to determining that the third IED is being added to the second power substation network. The third IED is coupled to the control server. In some embodiments, a determination is made that a human machine interface (HMI) device is being added to the first power substation network. A fourth communication path is established between the HMI device and the control server using the PRP virtual network. In some embodiments, the first IED includes a computer processor and a communication interface that transmits data over the PRP virtual network to the control server. The first IED may transmit a control command to the first electric power hardware device in response to analyzing sensor data associated with the sensor. In some embodiments, the first electric power hardware device is a circuit breaker, a transformer, voltage regulator, a recloser control, or a capacitor bank. In some embodiments, the first control data includes a control command that updates a protective function that is performed by the first IED. In some embodiments, the control server is a master node in a supervisory control and data acquisition (SCADA) system. In some embodiments, the first network protocol is Rapid Spanning Tree Protocol (RSTP).

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using virtual networks to provide communication paths for new intelligent electronic devices (IEDs) on power substation networks. For example, a parallel redundancy protocol (PRP) IED may be added to an existing electric power distribution network that is based on a previous network protocol (e.g., rapid spanning tree protocol (RSTP) for network redundancy). Rather than connecting a separate network infrastructure to an existing power substation network, new PRP-based IEDs may connect to existing network elements by separating the previous infrastructure and the new IEDs virtually. In some embodiments, for example, a network controller generates a virtual network based on a parallel redundancy protocol alongside a previous RSTP virtual network to establish network connections among new IEDs. Using multiple virtual networks, both PRP devices as well as non-PRP devices may operate on a network simultaneously. As such, a network controller may establish a communication path for a new IED over a power substation network to a control server without interfering with network protocols and communication paths for already established nodes. Accordingly, this technical solution may implement plug-and-play for new IEDs while also minimizing changes to existing power substation control systems.

Figure 1:
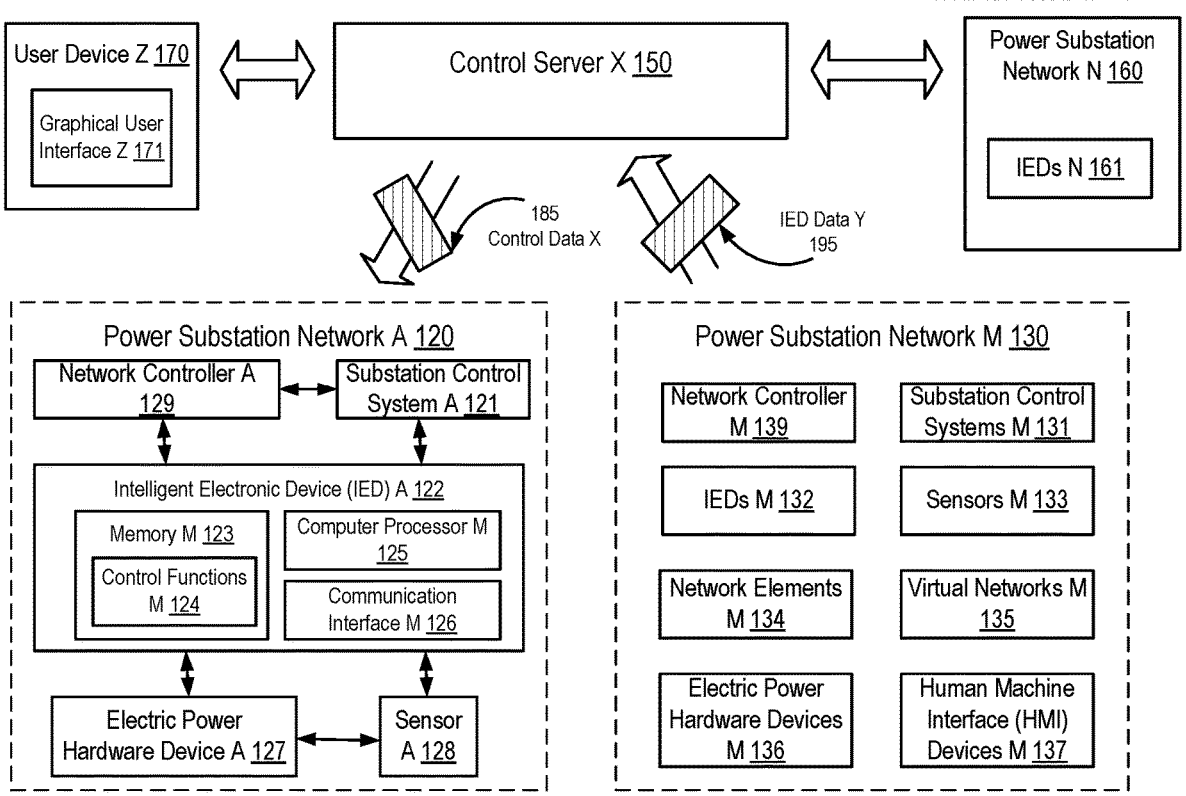
FIG. 1 shows a system in accordance with one or more embodiments.

Turning to FIG. 1, FIG. 1 shows a schematic diagram in accordance with one or more embodiments. As shown in FIG. 1, an electric power distribution network (e.g., electric power distribution network A (100)) may include one or more network controllers (e.g., network controller A (129), network controller M (139)), one or more control servers (e.g., control server X (150)), one or more power substation networks (e.g., power substation network A (120), power substation network M (130), power substation network N (160)), various user devices (e.g., user device Z (170)), various intelligent electronic devices (e.g., IED A (122), IEDs M (132), IED N (162)), various electric power hardware devices (e.g., electric power hardware device A (127), electric power hardware devices M (136)), various control systems (e.g., substation control system A (121), substation control system M (131)), and/or various network elements (e.g., network elements M (134)). Network elements may include switches, routers, hubs, cross connections, repeaters, active network components, and/or passive network components. In particular, a network element may be an addressable set of equipment that forms a portion of a communications path and serves a section, line or path terminating function. Moreover, the electric power distribution network A (100) may be similar to network (430) described below in FIG. 4 and the accompanying description. User devices may include personal computers, handheld computer devices such as a smartphone or personal digital assistant, or a human machine interface (HMI) device (e.g., HMI devices M (137)). Electric power hardware devices may include power system equipment, such as power transformers, circuit breakers, recloser controls, capacitor banks, and electronic multifunction meters. In some embodiments, user devices, IEDs, network controllers, network elements, control servers, and/or control systems include computer systems similar to computer system (402) shown in FIG. 4 and the accompanying description.

Turning to network controllers, a network controller may refer to a hardware controller or a software-defined network controller operating on one or more network elements that includes functionality to administer a power substation network and/or an electric power distribution network. For example, a network controller may determine communication paths between different end points in a network (e.g., a communication path between IED A (122) and substation control system A (121) or control server X (150)). Likewise, a network controller may also perform network telemetry among various network nodes in order to determine faults, network errors, congestion, and other events throughout an electric power communication network. In some embodiments, a network controller manages a routing table for one or more virtual networks operating on one or more power substation networks.

Turning to IEDs, an IED may be a device connected to a power substation network or other network that includes one or more computer processors (e.g., computer processor M (125)), one or more communication interfaces (e.g., communication interface M (126)), and one or more memories (e.g., memory A (123), memory M (131)). Moreover, the IED may be coupled to one or more electric power hardware devices (e.g., electric power hardware device A (127), electric power hardware devices M (136)) and one or more sensors (e.g., sensor A (128), sensors M (133)) for monitoring electric power equipment. In some embodiments, an IED includes hardware and/or software with functionality for performing one or more control functions (e.g., control functions M (124)), such as receiving or transmitting data (e.g., control data X (185), IED data Y (195)) over a power substation network. For example, an IED may include hardware and/or software with functionality for performing electrical protection functions, collecting local control intelligence with respect to electric power hardware, and/or monitoring various processes performed with equipment. Likewise, an IED may include a communication interface (e.g., communication interface M (126)) for communicating directly with one or more control systems or other network devices, such as a master node in a SCADA system.

In some embodiments, IEDs transmit one or more control commands to electric power hardware devices, such as for tripping circuit breakers based on detected voltage, current, or frequency anomalies. A control command may also be used to raise or lower transformer tap positions in order to maintain a desired voltage level. Control commands may be transmitted based on sensor data acquired from sensors and/or control data received from a control server, a control system (e.g., substation control system A (121), substation control system M (131)), and/or another IED. Examples of IEDs may include protective relay devices, transformer tap changer controllers, circuit breaker controllers, capacitor bank switches, recloser controllers, voltage regulators, and remote terminal units.

Furthermore, a control server may be a remote device coupled to one or more power substation network (e.g., power substation network A (120), power substation network M (130), power substation network N (160)) with hardware and/or software for managing multiple IEDs, control systems, and various electric power hardware devices. For example, a control server may securely and centrally manage different types of IEDs deployed throughout an entire electric power communication network (e.g., electric power communication network A (100)). In some embodiments, for example, a control server manages faults within power substation networks and control IEDs, substation control systems, and other network devices remotely, e.g., using control commands. Likewise, a control server may provide two-factor authentication access to various users (e.g., a user operating user device Z (170)), automatically update configuration settings among IEDs and/or electric power hardware devices, and/or automatically detect changes within power substation networks such as to notify users accordingly. For example, a control server may automatically collect and store fault data, event summaries, and oscillographic event reports. In some embodiments, control data (e.g., control data X (185)) is transmitted by a control server to one or more IEDs over an electric power communication network. For example, control data may include one or more software updates (e.g., new firmware versions), configuration settings, and/or changes to various control function algorithms for various IEDs.

In some embodiments, IED data are transmitted over an electric power communication network. For example, IED data may include operational and non-operational data relating to various functions performed by one or more IEDs. Operational data may include data that describes instantaneous values of power system analog and status points such as volts, amps, watts, a circuit breaker's status, switch positions. An example of operational data may include data for a supervisory control and data acquisition (SCADA) system. As such, operational data may also include control data that is time critical and used to monitor and control an electric power system (e.g., by opening circuit breakers, changing tap settings, indicating equipment failures). On the other hand, non-operational data may include data files and waveforms such as event summaries, oscillographic event reports, status points, and analog points that have a logical state or a numerical value. Non-operational data may be used for predictive analytics or monitoring the long-term health of a substation or electric power transmission distribution system.

Turning to power substation networks, a power substation network may include one or more control systems (e.g., substation control system A (121), substation control system M (131)). For example, a substation control system may be a data concentrator that may include hardware and/or software for polling IEDs and other devices for analog values and status changes at various data collection rates. Likewise, a substation control system may maintain a local database. In some embodiments, a substation control system may include functionality for acting as a gateway towards one or more control servers. Power substation networks may use various communication protocols, such as IEEE 802.3 for Ethernet. Further, various substation automation applications may operate on a power substation network. For example, multiple communication paths may transmit IED data between IEDs and a control server. In some embodiments, communication paths transmit through a SCADA system as well as other external devices, such as a data warehouse.

Returning to IEDs, IEDs may support various communication protocols to transmit and/or receive IED data, control data, and other data over an electric power communication network. In particular, an IED may use communication protocols based on one or more standards promulgated by the International Electrotechnical Commission (IEC), such as the IEC61850 standard for substation automation. For example, IEC61850 may provide a protocol suite for interoperability and advanced communications capabilities among various IEDs. Another communication protocol is Distributed Network Protocol (DNP) 3.0, which is a communications protocol used in SCADA systems and remote monitoring systems. Likewise, the communication protocols may also include IEC 60870 part 5 (also called "IEC104"), which may be used for telecontrol in electrical engineering and power system automation applications.

In some embodiments, an electric power communication network includes multiple virtual networks (e.g., virtual networks M (135)). For example, a virtual network or a virtual local area network (VLAN) may connect various devices using software. Where a physical network may use layer 2 and layer 3 functions of the Open Systems Interconnection (OSI) model based on physical network elements, virtual networking may implement various network functions using software alone. For example, a virtual switch (also called a "vSwitch") may controls and direct communication between an existing physical network and virtual parts of the physical network. In some embodiments, virtual networks are implemented using VLAN tagging. In particular, the IEEE 802.1Q specification provides one VLAN tag format that may allow up to 4096 different VLANs to exist in a single physical network. In the IEEE 802.1Q specification, VLAN tagging is implemented uses a priority field, a tag protocol identifier (TPID) field, a drop eligible indicator (DEI) field, and a VLAN ID field. The VLAN ID field may specify a particular virtual network among the 4096 possible options. Accordingly, a VLAN tag may be inserted in an Ethernet frame or other packet frame after the destination and source addresses.

In some embodiments, VLAN pruning is performed on trunk links between a virtual network and a PRP network in the electric power communication network. To remove excessive unwanted traffic on the communication network, for example, a VLAN pruning method may be used among network switches or other network devices to prune IED data from going to network switches that do not have any host devices for the respective VLAN.

In some embodiments, a virtual network is implemented within a power substation network to prevent network loops among communication paths. In particular, network loops may be responsible for multiple problems in routing IED data from IEDs to a control server or other network destination. For example, duplicate IED data may be received by a control server when a network element receives a broadcast without knowing the address of the final destination node. As such, the network element may broadcast IED data to every port thereby resulting in a situation where the control server may receive duplicate copies of IED data. This duplicated IED data may waste network bandwidth on redundant data or cause unrecoverable data errors among various control functions.

In some embodiments, a virtual network is implemented using a rapid spanning tree protocol (RSTP) or another spanning tree protocol (STP). For example, RSTP may be a network protocol based on the IEEE 802.1w standard while STP may be based on IEEE 802.1D standard. As such, RSTP, STP, or another network protocol may provide a "loop-free" topology within a virtual network for transmitting control and IED data between a control server and one or more IEDs. When a network fault occurs on a virtual network with RSTP or STP, IEDs may continue communicating across the electric power communication network as IED data or control data is rerouted around the fault. Moreover, RSTP may prevent network loops when using multiple network elements by blocking redundant communication paths. For example, RSTP may establish a root bridge at a specific network element by blocking specific ports on the network element. By tailoring available ports within power substation networks, for example, network loops may be prevented accordingly. A blocked port may still receive data but may not send that data out to other devices on the network. This loop-preventing mechanism may ensure that network elements only receive a single copy of IED data. If an active communication path fails, one of the blocked ports may become available for new communication paths.

Keeping with spanning tree protocols, other spanning tree protocols are contemplated such as Multiple Spanning Tree Protocol (MSTP), Per VLAN Spanning Tree (PVST), Enhanced Per VLAN Spanning Tree (PVST+), and Rapid Per VLAN Spanning Tree (RPVST). For example, MSTP was initially defined in IEEE 802.1s and later included in IEEE 802.1Q, which may support mapping of multiple VLANs onto a single spanning-tree instance. PVST, PVST+, and RPVST are Cisco® proprietary protocols that allow certain network devices to have multiple spanning trees. Moreover, PVST+ is a Cisco® enhancement of STP that provides a separate 802.1D spanning-tree instance for each VLAN configured in a network. On the other hand, RPVST is an updated protocol that can generate one spanning tree topology for each VLAN on a network. However, while some spanning tree protocols are described in particular, any suitable spanning tree protocol may be used accordingly.

In some embodiments, a virtual network is implemented using a Parallel Redundancy Protocol (PRP). PRP may be a network protocol standard that provides a failover mechanism in response to detecting faults or other network failures among any network elements. More specifically, a PRP node may have two ports that correspond to separate communication paths associated with segregated network elements within a network. If any network element in one communication path fails for a particular PRP node, then this failure may not impact the other communication path that has no overlapping network elements.

Returning to control systems, control systems may include a programmable logic controller (PLC), a distributed control system (DCS), a supervisory control and data acquisition (SCADA), and/or a remote terminal unit (RTU). For example, a programmable logic controller may control valve states, fluid levels, pipe pressures, warning alarms, and/or pressure releases throughout a well facility or power-generation facility. In particular, a programmable logic controller may be a ruggedized computer system with functionality to withstand vibrations, extreme temperatures, wet conditions, and/or dusty conditions, for example, around a refinery. A distributed control system may be a computer system for managing various processes at various facilities using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system. Likewise, a control system may be coupled to one or more well devices or electric-power generation devices.

In some embodiments, a SCADA system includes a master node. For example, a control server may be a master node that provides acquired IED data and control data to a human operator for performing remote control tasks. The master node may server as a central monitoring station that may present real-time data to a human user for optimizing electric power operations.

In some embodiments, a user device (e.g., user device Z (170)) may communicate with a control server to manage electric-power generation and/or electric power distribution over a electric power communication network. For example, a user may interact with a user interface (e.g., graphical user interface Z (171)) to change thresholds and parameters for electric power hardware devices, e.g., to achieve electric power optimizations. Through user selections or automation, the control server may provide various reports for information in a graphical user interface regarding predicted electricity production, status updates on power substations, etc.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
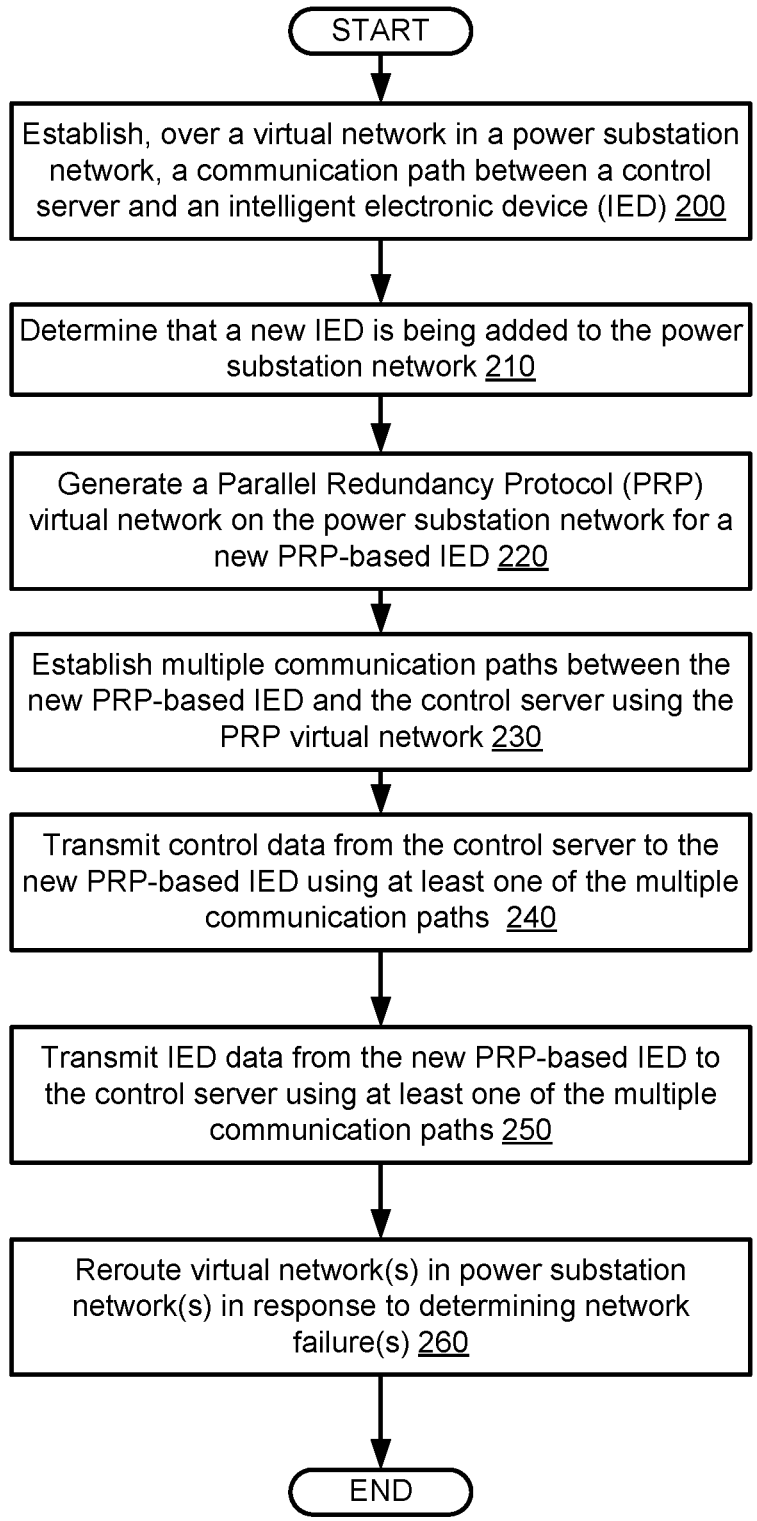
FIG. 2 shows a flowchart in accordance with one or more embodiments.

Turning to FIG. 2, FIG. 2 shows a flowchart in accordance with one or more embodiments. Specifically, FIG. 2 describes a general method for managing communication paths between a control server and various intelligent electronic devices (IEDs) in power substation networks. One or more blocks in FIG. 2 may be performed by one or more components (e.g., network controller A (129)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, a communication path is established over a virtual network between a control server and an IED in accordance with one or more embodiments.

In Block 210, a determination is made that a new IED is being added to a power substation network in accordance with one or more embodiments. For example, a new IED may be added to an existing VLAN. On the other hand, the new IED may be a PRP-based IED that is added to a PRP virtual network.

In some embodiments, for example, a network controller may receive a request to provide a communication path to a new IED. The request may be a network message transmitted between the new IED and the network controller that identifies a network location associated with the new IED. In some embodiments, the new IED may broadcast requests over a power substation network or an electric power communication network to initiate changes to network topology for setting up the new IED.

In Block 220, a Parallel Redundancy Protocol (PRP) virtual network is generated on the power substation network for a new PRP-based IED in accordance with one or more embodiments. For example, a network controller may assign a new VLAN identifier to a new virtual network. Moreover, a network protocol may be preassigned to the new virtual network. Likewise, the network controller may also determine a network protocol for the virtual network based on avoiding any network interference with one or more virtual networks already operating on a physical network.

In Block 230, multiple communication paths are established between a new PRP-based IED and a control server using the new virtual network in accordance with one or more embodiments. The communication paths may be generated using a network protocol associated with the new virtual network. For example, a PRP virtual network may include two communication paths for redundancy.

In Block 240, control data are transmitted from a control server to the new PRP-based IED using at least one of multiple communication paths in accordance with one or more embodiments.

In Block 250, IED data are transmitted from the new PRP-based IED to a control server using at least one of the multiple communication paths in accordance with one or more embodiments.

In Block 260, one or more virtual networks are rerouted for one or more power substation networks in response to determining one or more network failures in accordance with one or more embodiments. For example, a network controller or other network element may make decisions on abnormal situations in a power substation network to reroute communication paths around one or more network failures, such as faults. As such, control commands may also be transmitted to switches and breakers to clear a particular fault.

Figure 3A:
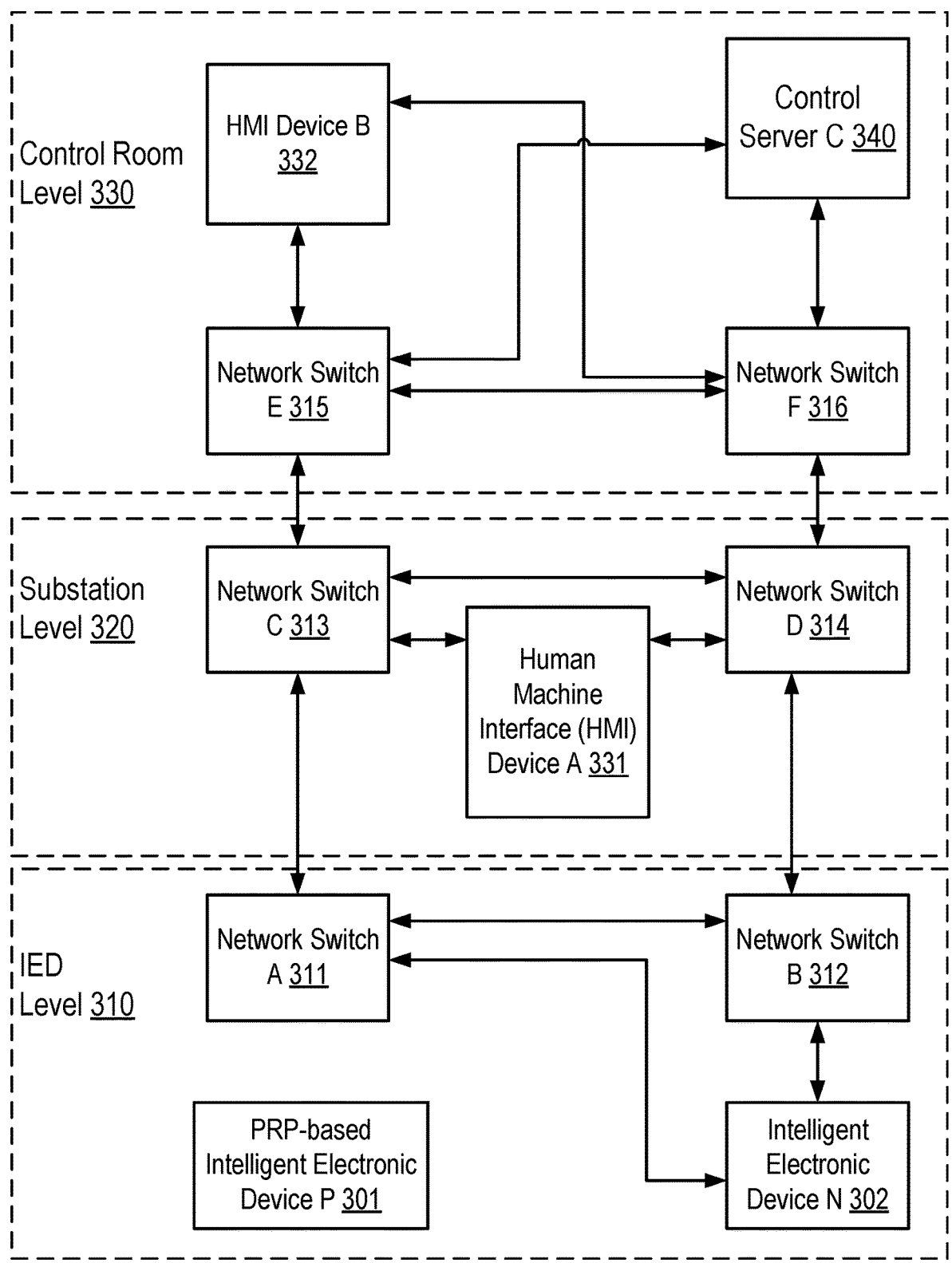
FIGS. 3A, 3B, and 3C show an example in accordance with one or more embodiments.
Figure 3B:
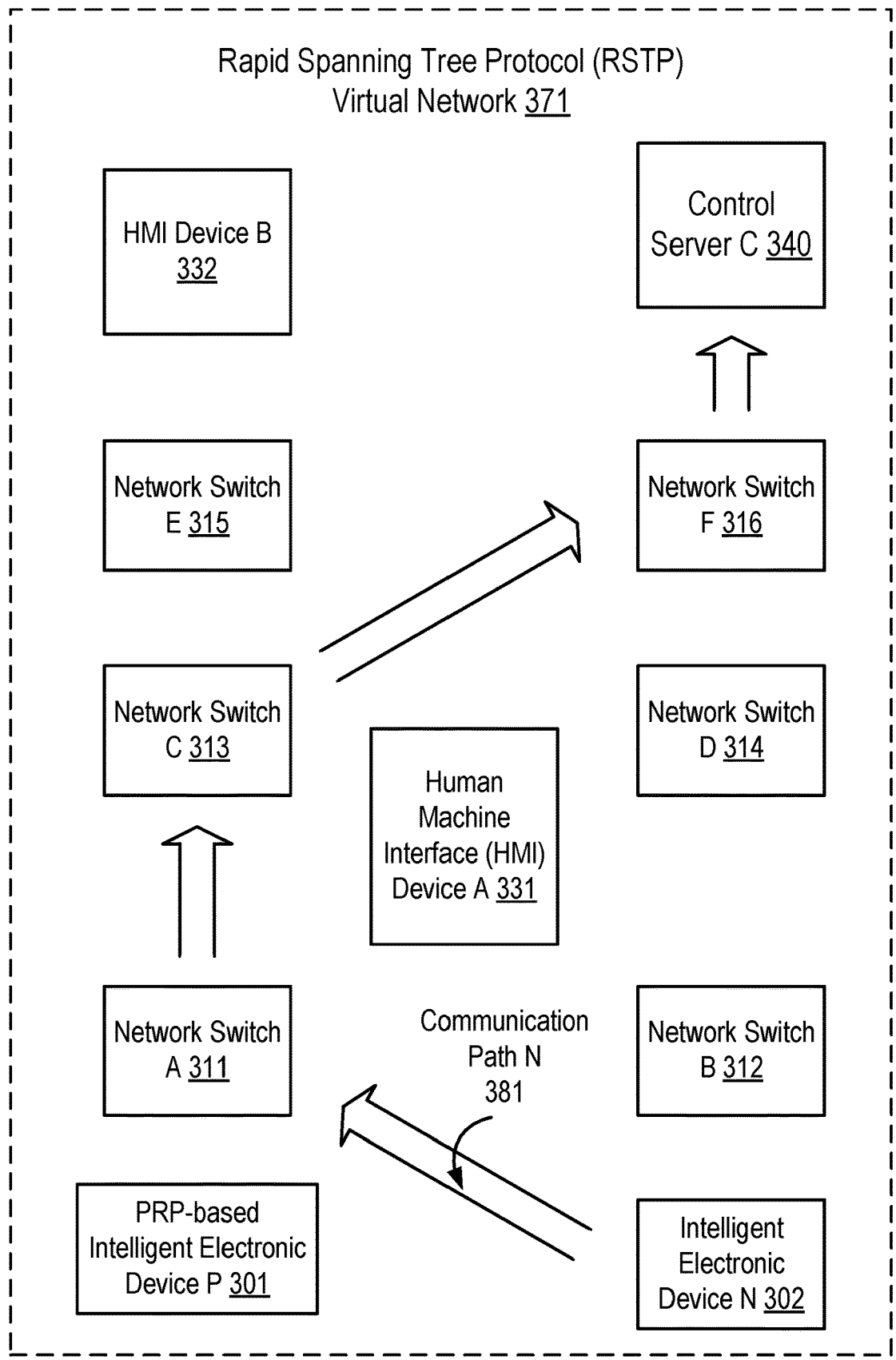
Figure 3C:
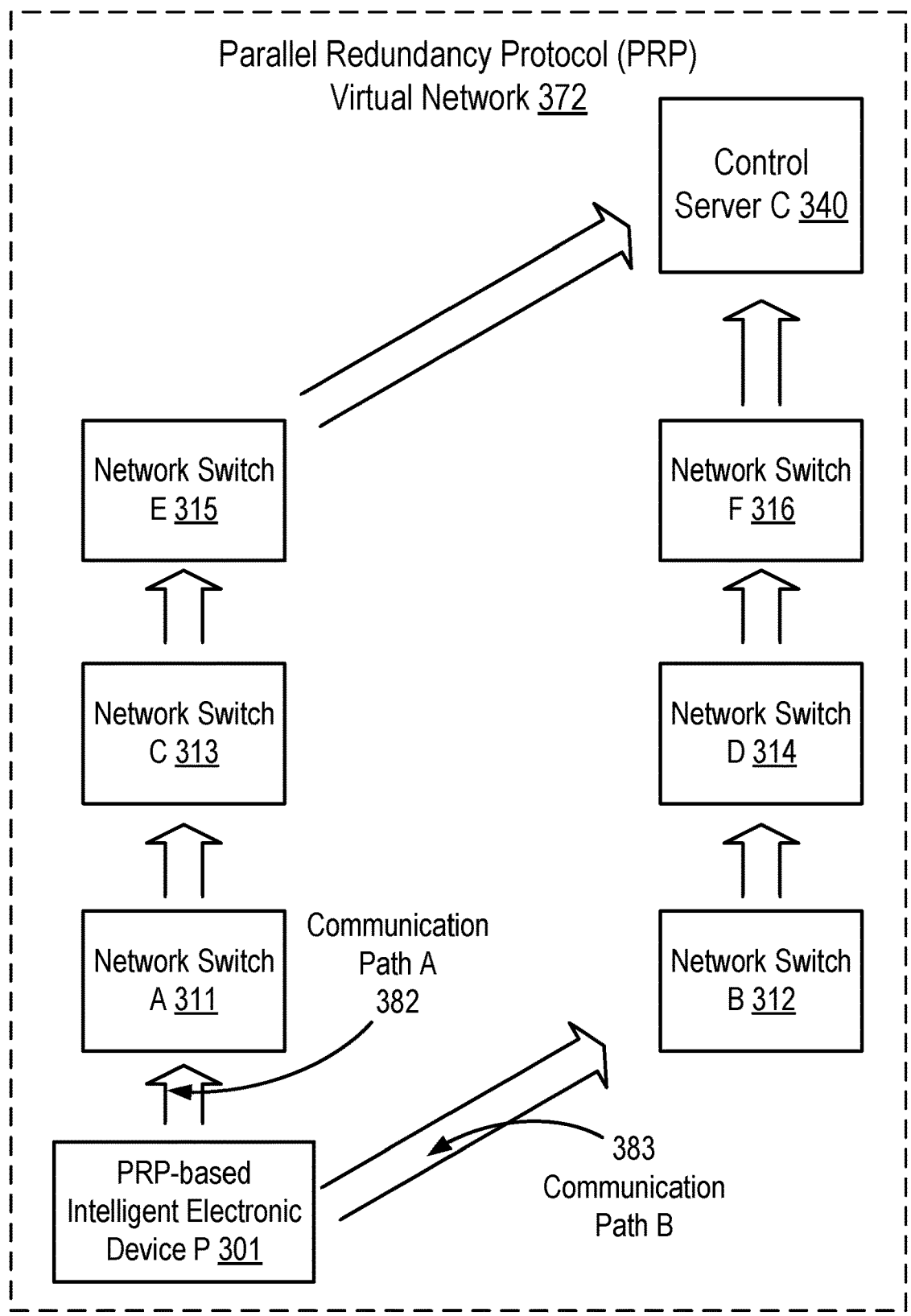

Turning to FIGS. 3A, 3B, and 3C, FIGS. 3A, 3B, and 3C provide an example of adding an intelligent electronic device (IED) to a physical network in accordance with one or more embodiments. The following example is for explanatory purposes only and not intended to limit the scope of the disclosed technology. As shown in FIG. 3A, a physical network includes multiple levels, i.e., a control room level (330), a substation level (320), and an IED level (310). For example, the physical network may include the physical hardware, such as hardware switches, hardware routers, and various hardware devices that connect various network components. The IED level (310) includes a PRP-based IED P (301), an IED N (302), and various network elements, i.e., network switch A (311) and Network switch B (312). The substation level (320) includes a human machine interface (HMI) device A (331) and various network elements, i.e., network switch C (313) and network switch D (314). The control room level (330) includes a control server C (340), an HMI device B (332), and various network elements, i.e., network switch E (315) and network switch F (316).

Turning to FIG. 3B, FIG. 3B shows a rapid spanning tree protocol (RSTP) virtual network (371) operating on the physical network from FIG. 3A. In particular, IED N (302) communicates with the control server C (340) over the RSTP virtual network (371) using a communication path N (381). Because RSTP prevents the IED N (302) from having redundant communication paths to transmit data to the control server C (340), the RSTP virtual network (371) will reconfigure the communication path N (381) in response to detecting a fault or other network error affecting network traffic.

Turning to FIG. 3C, a new IED, i.e., PRP-based IED P (301), is added to the physical network shown in FIG. 3B. Because RSTP prevents redundant communication paths, a new communication path may not simply be produced in the RSTP virtual network (371) for the PRP-based IED P (301) in order to communicate with control server C (340). Accordingly, a network controller (not shown) generates a new virtual network for the PRP-based IED P (301), i.e., PRP virtual network (372). In the PRP virtual network (372), the network controller assigns two communication paths to the PRP-based IED P (301) for communication with control server C (340), i.e., communication path A (382) and communication path B (383). As shown in FIG. 3C, there is no overlap in network elements between communication path A (382) and communication path B (383). In case of failover, the PRP-based IED P (301) may change from using communication path A (382) to using communication path B (383) to transmit IED data or receive control data.

Figure 4:
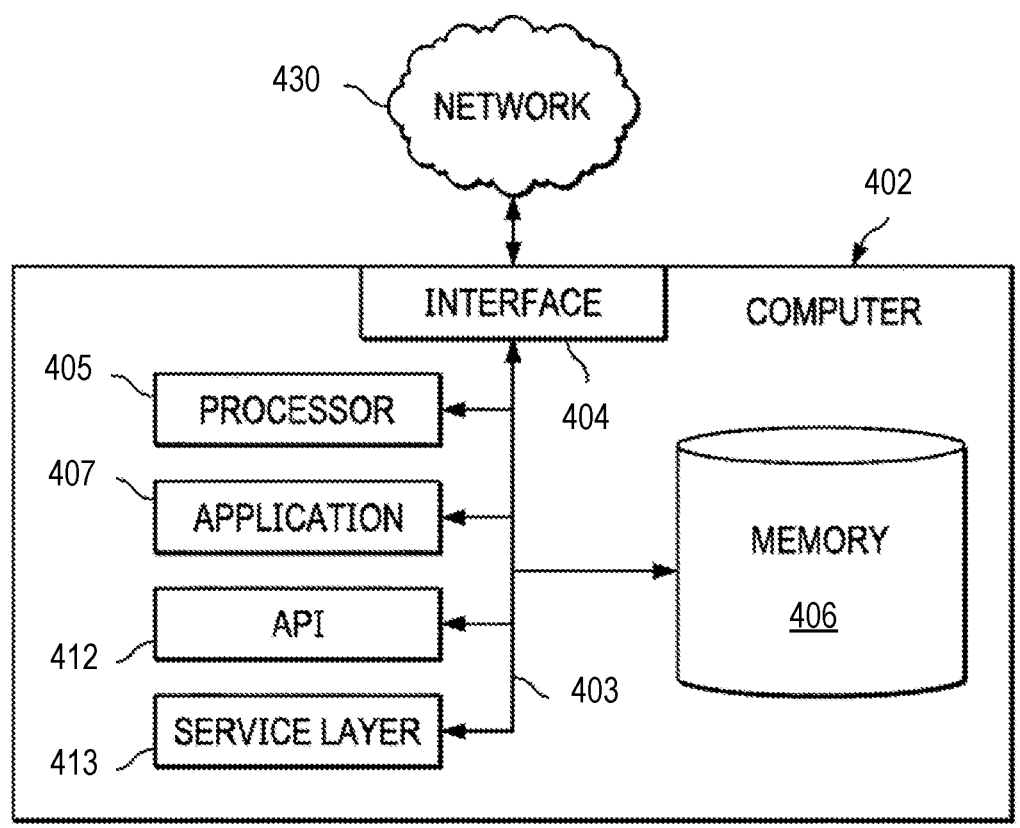
FIG. 4 shows a computer system in accordance with one or more embodiments.

Embodiments may be implemented on a computer system. FIG. 4 is a block diagram of a computer system (402) used to provide computational functionalities associated with described algorithms, methods, functions, processes, flows, and procedures as described in the instant disclosure, according to an implementation. The illustrated computer (402) is intended to encompass any computing device such as a high performance computing (HPC) device, server, desktop computer, laptop/notebook computer, wireless data port, smart phone, personal data assistant (PDA), tablet computing device, one or more computer processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or other suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404 includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single processor (405) in FIG. 4, two or more computer processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing computer (402), each computer (402) communicating over network (430). Further, the term "client," "user," and other appropriate terminology may be used interchangeably as appropriate without departing from the scope of this disclosure.

Moreover, this disclosure contemplates that many users may use one computer (402), or that one user may use multiple computers (402).

In some embodiments, the computer (402) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
   establishing, by a network controller and over a first virtual network in a first power substation network, a first communication path between a control server and a first intelligent electronic device (IED), wherein the first virtual network uses a first network protocol that prevents redundant paths within the first virtual network, and wherein the first IED is coupled to a sensor that is coupled to a first electric power hardware device;
   generating, by the network controller, a Parallel Redundancy Protocol (PRP) virtual network in the first power substation network in response to determining that a PRP-based IED is being added to the first power substation network;
   establishing, by the network controller and over the PRP virtual network, a second communication path and a third communication path between the control server and the PRP-based IED, wherein the second communication path corresponds to a first plurality of network elements in the first power substation network and the third communication path corresponds to a second plurality of network elements in the first power substation network that are different than the first plurality of network elements,
   wherein the PRP virtual network uses a second network protocol that is different from the first network protocol that is used by the first virtual network; and
   transmitting first control data to the first IED over the first communication path and second control data to the PRP-based IED over the second communication path.

2. The method of claim 1, further comprising:
   determining that a third IED is being added to a second power substation network coupled to the control server; and
   generating a third virtual network in the second power substation network in response to determining that the third IED is being added to the second power substation network,
   wherein the third IED is added to the third virtual network.

3. The method of claim 1,
   wherein the PRP virtual network is generated after the first IED is connected to the first power substation network.

4. The method of claim 1, further comprising:
   transmitting, by the first IED, first IED data to the control server over the first communication path; and
   transmitting, by the PRP-based IED, second IED data to the control server over at least one of the second communication path and the third communication path.

5. The method of claim 4,
   wherein the first IED data corresponds to sensor data regarding a first electric power hardware device coupled to the first IED and the second IED data corresponds to sensor data for a second electric power hardware device coupled to the PRP-based IED.

6. The method of claim 1, further comprising:
   determining that a third IED is being added to a second power substation network; and
   generating a third virtual network in the second power substation network in response to determining that the third IED is being added to the second power substation network,
   wherein the third IED is coupled to the control server.

7. The method of claim 1, further comprising:
   determining that a human machine interface (HMI) device is being added to the first power substation network; and
   establishing a fourth communication path between the HMI device and the control server using the PRP virtual network.

8. The method of claim 1,
   wherein the first IED comprises a computer processor and a communication interface that is configured to transmit data over the PRP virtual network to the control server, and
   wherein the first IED is configured to transmit a control command to the first electric power hardware device in response to analyzing sensor data associated with the sensor.

9. The method of claim 1,
   wherein the first electric power hardware device is selected from a group consisting of a circuit breaker, a transformer, voltage regulator, a recloser control, and a capacitor bank.

10. The method of claim 1,
    wherein the first control data comprises a control command that updates a protective function that is performed by the first IED.

11. The method of claim 1,
    wherein the control server is a master node in a supervisory control and data acquisition (SCADA) system.

12. The method of claim 1,
    wherein the first network protocol is Rapid Spanning Tree Protocol (RSTP).

13. A computer system, comprising:
    a computer processor; and a memory coupled to the computer processor, wherein the memory comprises instructions executable by the computer processor and configured to:
  establish, over a first virtual network in a first power substation network, a first communication path between a control server and a first intelligent electronic device (IED), wherein the first virtual network uses a first network protocol that prevents redundant paths within the first virtual network, and wherein the first IED is coupled to a sensor that is coupled to a first electric power hardware device;
  generate a Parallel Redundancy Protocol (PRP) virtual network in the first power substation network in response to determining that a PRP-based IED is being added to the first power substation network; and
  establish, over the PRP virtual network, a second communication path and a third communication path between the control server and the PRP-based IED, wherein the second communication path corresponds to a first plurality of network elements in the first power substation network and the third communication path corresponds to a second plurality of network elements in the first power substation network that are different than the first plurality of network elements,
  wherein the PRP virtual network uses a second network protocol that is different from the first network protocol that is used by the first virtual network.

14. The computer system of claim 13, wherein the memory further comprises instructions executable by the computer processor and configured to:
  determine that a third IED is being added to a second power substation network coupled to the control server; and
  generate a third virtual network in the second power substation network in response to determining that the third IED is being added to the second power substation network,
  wherein the third IED is added to the third virtual network.

15. The computer system of claim 13, wherein the first network protocol is Rapid Spanning Tree Protocol (RSTP).

16. The computer system of claim 13, wherein the memory further comprises instructions executable by the computer processor and configured to:
  determine that a third IED is being added to a second power substation network; and
  generate a third virtual network in the second power substation network in response to determining that the third IED is being added to the second power substation network,
  wherein the third IED is coupled to the control server.

17. The computer system of claim 13, wherein the memory further comprises instructions executable by the computer processor and configured to:
  determine that a human machine interface (HMI) device is being added to the first power substation network; and
  establish a fourth communication path between the HMI device and the control server using the PRP virtual network.

18. The computer system of claim 13,
wherein the first IED comprises a computer processor and a communication interface that is configured to transmit data over the PRP virtual network to the control server, and
wherein the first IED is configured to transmit a control command to the first electric power hardware device in response to analyzing sensor data associated with the sensor.

19. A system, comprising:
a control server;
a network controller comprising a computer processor;
a power substation network coupled to the control server and the network controller, the power substation network comprising:
  a first plurality of network elements,
  a second plurality of network elements that are different from the first plurality of network elements,
  a first intelligent electronic device (IED) coupled to the first plurality of network elements, and the second plurality of network elements, and
wherein the first IED is configured to transmit power substation data over a first virtual network to the control server using a first communication path using a first network protocol; and
a second IED coupled to the control server and the power substation network,
wherein the network controller is configured to establish, over a Parallel Redundancy Protocol (PRP) virtual network, a second communication path and a third communication path between the control server and the second IED,
wherein the second communication path corresponds to the first plurality of network elements and the third communication path corresponds to the second plurality of network elements, and
wherein the PRP virtual network uses a second network protocol that is different from the first network protocol.

20. The system of claim 19,
wherein the power substation network comprises a first electric power hardware device, a second electric power hardware device, and a substation control system coupled to the first IED and the second IED,
wherein the first IED is configured to manage the first electric power hardware device, and
wherein the second IED is configured to manage the second electric power hardware device.

* * * * *